United States Patent

Hashiba et al.

[11] Patent Number: 5,747,156
[45] Date of Patent: May 5, 1998

[54] THERMOSENSITIVE MAGNETIC RECORDING MEDIUM

[75] Inventors: Hidetoshi Hashiba; Shoji Aoyagi; Hitoshi Fujii; Kiyoshi Kojo, all of Hyogo, Japan

[73] Assignee: New Oji Paper Co., Ltd., Tokyo, Japan

[21] Appl. No.: 632,161

[22] Filed: Apr. 15, 1996

[51] Int. Cl.$^6$ ........................................ G11B 5/70
[52] U.S. Cl. ............... 428/328; 428/402; 428/694 BA; 428/900; 428/913; 283/82; 360/2
[58] Field of Search ........................ 428/328, 402, 428/694 BA, 900, 913; 283/82; 360/2

[56] References Cited

U.S. PATENT DOCUMENTS

| | | | |
|---|---|---|---|
| 4,884,260 | 11/1989 | Bouldin et al. | 369/93 |
| 5,439,755 | 8/1995 | Fujita et al. | 428/694 BP |

FOREIGN PATENT DOCUMENTS 07101169  4/1995  Japan.

*Primary Examiner*—Stevan A. Resan
*Attorney, Agent, or Firm*—Nikaido Marmelstein Murray & Oram, LLP

[57] ABSTRACT

A magnetic recording layer is provided on a base, and a thermosensitive recording layer is provided on the magnetic recording layer through a thermoplastic layer. The thermosensitive recording layer is a coating layer which is mainly composed of low melting point non-magnetic metal powder having shape anisotropy and a binder. The thermoplastic layer is prepared from a material having a melting temperature which is lower than that of the non-magnetic metal powder forming the thermosensitive recording layer, in a thickness of 1 to 20 μm. Information is printed on the thermosensitive recording layer with a thermal head.

18 Claims, 2 Drawing Sheets

THERMOSENSITIVE MAGNETIC RECORDING MEDIUM

BACKGROUND OF THE INVENTION

1. Field of the Invention

The present invention relates to a thermosensitive magnetic recording medium having a magnetic recording layer and a thermosensitive recording layer.

2. Description of the Background Art

On a magnetic recording medium utilized as a note such as a book of tickets or a prepaid card which is recently in circulation, visual information is generally recorded along with magnetic recording information, due to the necessity of visually confirming the balance.

The visual information is recorded by a thermal coloring dye method of coating the medium with a dye such as a leuco dye as a thermosensitive layer, or a metal deposition film thermal breaking material method of forming a thermosensitive layer by vacuum-depositing a metal such as tin. However, the thermal coloring dye method is inferior in weather resistance and has a problem of fading due to preservation, although this method is excellent in productivity. On the other hand, the metal deposition film thermal breaking method has problems such inferior productivity due to passage through a deposition step, difficulty in employment of a volatile raw material, requirement for a protective layer due to no practical strength of the deposition layer itself and the like, although this method is excellent in preservability with a theoretical possibility of permanent preservation since the metal deposition film is partially broken by heat.

SUMMARY OF THE INVENTION

An object of the present invention is to provide a thermosensitive magnetic recording medium which can satisfy preservability while attaining high productivity due to no requirement for a deposition step, and has practical strength with no protective layer.

The thermosensitive magnetic recording medium according to the present invention comprises a magnetic recording layer and a thermosensitive recording layer which are provided on a base. The present invention is characterized in that the thermosensitive recording layer is mainly composed of metal powder and a binder, and the metal powder is non-magnetic metal powder having low melting temperature and shape anisotropy.

The metal powder having shape anisotropy is in a flat shape represented by a plate shape, or a rod shape including a needle shape. In case of the flat shape, the powder is preferably not more than 3 μm in thickness, with an aspect ratio (mean diameter/mean thickness) of at least 3. In case of the rod shape, on the other hand, the minor axis length is preferably not more than 3 μm, with the ratio of the major axis length to the minor axis length of at least 3.

The metal powder is preferably subjected to lustering called leafing treatment.

The material for the metal powder can be prepared from a metal selected from a metal group consisting of In, Sn, Bi, Cd, Pb, Zn, Te and Al or an alloy thereof.

The volume of the metal powder is preferably 5 to 60% with respect to that of all solid components contained in the thermosensitive recording layer.

The thermosensitive magnetic recording medium according to the present invention may further comprise a thermoplastic layer between the magnetic recording layer and the thermosensitive recording layer. The thermoplastic layer comprises a material having a melting temperature which is lower than that of the non-magnetic metal powder forming the thermosensitive recording layer. A preferable material for the thermoplastic layer is a thermofusible material which comprises melting substances such as wax or the like. A proper thickness of the thermoplastic layer is 1 to 20 μm.

The thermosensitive magnetic recording medium according to the present invention is prepared by applying or printing paint which is mainly composed of the aforementioned metal powder having shape anisotropy, resin serving as binder etc. as the thermosensitive recording layer on the magnetic recording layer which is formed on the base. The metal powder contained in the thermosensitive recording layer exists with such directivity that its plane is substantially parallel to that of the thermosensitive recording layer due to its shape anisotropy, and conceals the color(s) of the magnetic recording layer etc.

Visual information is obtained by printing information on a surface of the thermosensitive magnetic recording medium which is opposed to the base with a thermal head or the like. Heating with the thermal head results in reduction of concealability of the thermosensitive layer with respect to the magnetic recording layer etc. caused by melting or deformation of the metal powder contained in the thermosensitive layer and/or scattering of reflected light due to turbulence of the shape or arrangement of the metal powder, for providing visibility by forming contrast between heated and unheated portions. In more concrete terms, the melting or deformation of the thermosensitive recording layer, or the turbulence of the shape or arrangement of the metal powder is that the metal powder is contracted or rounded. In the heating, further, a melted surface portion of the thermosensitive recording layer is slightly smoothed or deformed by contact pressure of the thermal head, to be of some help toward the formation of the contrast.

When the thermoplastic layer is further provided between the magnetic recording layer and the thermosensitive recording layer, the concealability with respect to the magnetic recording layer etc. is further reduced due to deformation of the thermoplastic layer in addition to the melting or deformation of the metal powder contained in the thermosensitive recording layer. Further, the material forming the thermoplastic layer may be absorbed by the magnetic recording layer, the thermosensitive recording layer or the thermoplastic layer itself, or the thermoplastic layer may be transparentized following the melting or deformation of the thermosensitive recording layer or the turbulence of the shape or arrangement of the metal powder. If the thermoplastic layer is whitened by adding white pigment or an other method, no high concealability of the thermosensitive recording layer is required, and metallic luster as obtained before can be attained by adding a small amount of metal powder resulting in low concealability. Consequently, the amount of application of the thermosensitive recording layer can be reduced, to contribute to improvement in sensitivity and clear recording.

The thermosensitive recording layer according to the present invention contains the metal powder, resin etc., whereby the thermosensitive recording layer itself has practical durability.

When the employed magnetic recording layer has a relatively pale tone and the visual information is intended to be printed in a dark color, or the color of the visual information is intended to be different in color from the magnetic recording layer, a colored layer may be provided under the thermosensitive recording layer. When the thermoplastic layer is provided under the thermosensitive recording layer, the colored layer is provided under the thermoplastic layer.

When a decorative color tone is required for the metal powder of the thermosensitive recording layer, a colored layer may be provided on the thermosensitive recording layer. When higher durability is required for the purpose of repeated use, a protective layer may be provided on the thermosensitive recording layer. Both of the colored layer and the protective layer may be provided.

According to the present invention, a thermosensitive magnetic recording medium which has excellent visual information preservability provided in that having a metal deposition film for a thermosensitive layer while maintaining high productivity similarly to a thermosensitive magnetic recording medium employing a thermal coloring dye for a thermosensitive layer, as well as a thermosensitive recording layer having remarkably excellent mechanical strength and chemical strength as compared with a metal deposition film.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
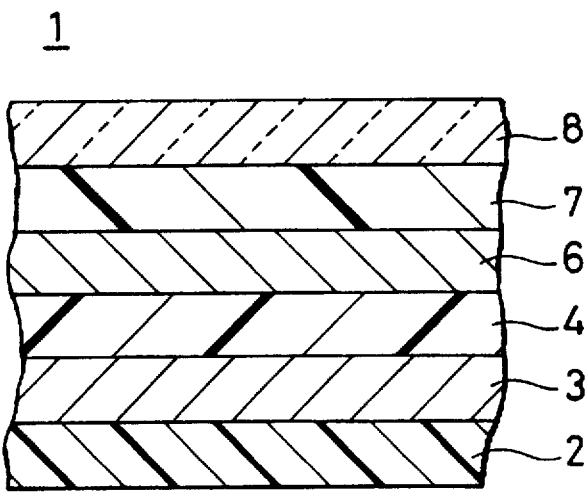
FIG. 1 is a schematic sectional view showing a thermosensitive magnetic recording medium according to an embodiment of the present invention.

A thermosensitive magnetic recording medium according to the present invention is now described with reference to an embodiment shown in FIG. 1. This embodiment is provided with a colored layer and a protective layer.

Base 2

A base 2 is in the shape of a film or a sheet, and a plastic film of polyester, polyethylene, polypropylene, nylon, polyimide or polycarbonate, a metal plate of copper, aluminum or the like, a paper, a net and/or the like can be employed as a simple body or a composite as the material therefor.

Magnetic Recording Layer 3

A magnetic recording layer 3 is formed on the base 2. The magnetic recording layer 3 is obtained by coating the base 2 with a paint which is obtained by dispersing a ferromagnetic substance such as $\gamma$-$Fe_2O_3$, cobalt-coated $\gamma$-$Fe_2O_3$, cobalt-doped $\gamma$-$Fe_2O_3$, chromium oxide, metal iron, iron carbide, barium ferrite or the like in resin or the like. Polyurethane resin, polyester resin, copolymer such as vinyl acetate-vinyl chloride, cellulose resin and/or epoxy resin can be employed as homopolymer or a mixed system as the resin employed in this case. In view of required physical properties etc., crosslinking agent, dispersant, plasticizer, viscosity adjuster, conductive agent and/or the like can be added at need.

These raw materials are mixed and dispersed in a sand mill, a ball mill, an attriter or the like, to prepare a magnetic paint. The magnetic recording layer can be prepared from the magnetic paint by a method such as gravure coating, die coating, roll coating, knife coating, printing or the like.

The magnetic recording layer 3 is preferably thermally cured after drying, in order to form a colored layer, a thermosensitive recording layer, a protective layer etc. thereon.

Alternatively, the magnetic recording layer may be prepared by another method of forming a metal or an alloy such as Fe, Fe—Cr, Fe—Co or Co—Cr on the base 2 by vacuum deposition, sputtering or plating.

Colored Layer 4

A colored layer 4 can be provided on the magnetic recording layer 3. The colored layer 4 is employed for making contrast between metallic luster of an unprinted portion of a thermosensitive recording layer 6 and one of a printed portion wherein metal powder is melted or deformed by heating by printing more conspicuous. For example, a magnetic recording layer 3 which is formed by deposition or plating hues similarly to the thermosensitive recording layer 6. Thus, The colored layer 4 is effective when the magnetic recording layer 3 and the thermosensitive recording layer 6 are similar in hue to each other.

In order to blend a paint for the colored layer 4, at least one binder selected from cellulose derivative such as nitrocellulose or cellulose acetate, homopolymer or copolymer of acrylic resin such as polymethyl methacrylate, polyethyl methacrylate, polyethyl acrylate or polybutyl acrylate, vinyl chloride resin, vinyl chloride copolymer, polyvinyl butyral, polyvinyl alcohol, polyester resin, polyurethane resin, epoxy resin and the like is added to pigment which is responsive to coloring with addition of dispersant, crosslinking agent, plasticizer, stabilizer and/or viscosity adjuster at need, and the mixture is properly diluted with solvent, water or the like and thereafter kneaded by a roll mill or a sand mill to obtain the paint. The paint is applied onto the magnetic recording layer by gravure coating, die coating, roll coating or knife coating or printed thereon, thereby obtaining the colored layer 4.

Thermosensitive Recording Layer 6

Figure 3:
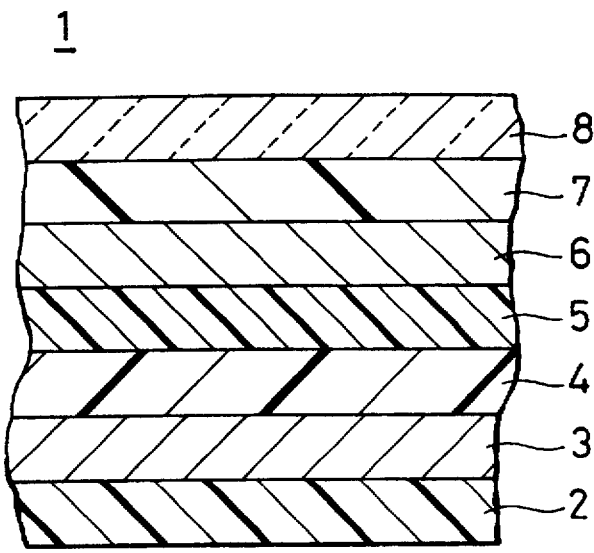
FIG. 3 is a schematic sectional view showing a thermosensitive magnetic recording medium according to still another embodiment of the present invention.

The thermosensitive recording layer 6 is formed on the magnetic recording layer 3 directly or through the colored layer 4, or further through a thermoplastic layer 5 as shown in FIG. 3 described later. Metal powder which is employed for the thermosensitive recording layer 6 preferably comprises pure metal having a relatively low melting point such as In, Sn, Bi, Cd, Pb, Zn, Te or Al, or an alloy such as solder alloy (25 to 90% of Sn and a rest of Pb) or the Wood's alloy (50% of Bi, 12.5% of Cd, 25% of Pb and 12.5% of Sn), so that the same is easy to deform by heating for printing or pressurization under heating.

The metal powder having shape anisotropy which is in a flat shape has thickness of not more than 3 µm and aspect ratio of at least 3, and more preferably, thickness of not more than 1 µm and aspect ratio of at least 5. The aspect ratio is obtained by dividing the plane diameter of the metal powder having shape anisotropy by its thickness. Under the present circumstances, the lower limit of the thickness in preparation is about 0.1 µm. However, the thickness is preferably minimized to facilitate deformation by heating. Similarly, the aspect ratio is preferably maximized in consideration of deformation. Considering the limit in preparation, or undesirable collapse in the paint preparation step etc., the aspect ratio of about 100 may conceivably be the upper limit in practice. Similarly, metal powder having shape anisotropy which is in a rod shape including a needle shape preferably has a minor axis length of not more than 1 μm and a ratio of a major axis length to the minor axis length of at least 3, and desirably a minor axis length of not more than 1 μm and a ratio of the major axis length to the minor axis length of at least 5. Under the present circumstances, the lower limit of the minor axis length is conceivably about 0.01 μm in preparation. However, the minor axis length is preferably minimized to facilitate deformation by heating. Similarly, the ratio of the major axis length to the minor axis length is preferably maximized in consideration of deformation. Considering the limit in preparation, collapse in the paint preparation step etc., the ratio of about several 10 may conceivably be the upper limit in practice.

Heating with a thermal head which is generally employed for thermosensitive recording is performed only in a short time of about 1/100 sec. under a temperature of not more than 500° C., and hence it tends to be difficult to deform the metal powder by heating or heating under pressurization by printing with the thermal head if the thickness or the minor axis length is exceeded even in case of a metal having a low melting point. If the aspect ratio or the ratio of the major axis length to the minor axis length is less than 3, the degree of deformation of the metal powder having shape anisotropy caused by heating or pressure tends to be so small that sufficient contrast change tends not to be attained and printing tends to be unclear.

The metal powder is treated in a stamp mill with addition of crushing assistant agent such as higher fatty acid such as stearic acid or oleic acid, or higher alcohol such as lauryl alcohol or oleyl alcohol. Further, leafing treatment (lustering) is thereafter preferably performed with an attriter, a ball mill or a sand mill.

Acrylic resin, polyurethane resin, polyester resin, polyvinyl chloride resin, polyvinyl acetate resin, polyvinyl alcohol resin, vinyl acetate-vinyl chloride copolymer, polyvinyl butyral resin or the like can be employed as the resin used for the thermosensitive recording layer 6. In view of required physical properties etc., crosslinking agent such as polyisocyanate, dispersant, plasticizer, lubricant, conductive agent, preservative and/or the like can be added at need.

Since the thermosensitive recording layer 6 comprises a filler of metal grains and resin, the paint is prepared by mixing and dispersing the aforementioned raw materials by an attriter, a ball mill or a sand mill. The thermosensitive recording layer 6 is formed by applying the paint by gravure coating, die coating, roll coating or knife coating, or by printing the same. Such formation of a layer by coating or printing is referred to as formation by application.

Thus, the thermosensitive recording layer 6, which is basically formed by a resin layer having a filler of metal powder, itself has high mechanical strength, and is excellent in friction resistance, wear resistance and corrosion resistance.

The metal powder is preferably contained in the thermosensitive recording layer 6 by 5 to 60 volume %, desirably by 10 to 50 volume %, with respect to the volume of all solid components contained in the thermosensitive recording layer 6. If the content of the metal powder is larger than this range, it tends to be difficult to obtain a thermosensitive recording layer having practical smoothness. If the volume is less than the range, concealability with respect to the magnetic recording layer 3 or the colored layer 4 tends to be so in-sufficient that no sufficient contrast can be attained upon deformation by heating. The volume percentage can be readily calculated by dividing the solid weight introduced as to each raw material by true specific gravity and dividing the value of only the metal powder by the total sum of the values of all raw materials. The content of the metal powder is defined by volume percentage since it is conceivable that the volume content dominates the concealability and confusion caused by specific gravity difference between metals upon employment of weight contents must be avoided. In order to improve the concealability, a flat plane of the metal powder is preferably substantially parallel to that of the base. This is called in-plane orientation, and an effect of such in-plane orientation can be naturally expected in the application step. In order to attain the effect of in-plane orientation, further, calendering or pressurization is further preferably performed for attaining concealability.

The thickness of the thermosensitive recording layer 6 itself is preferably at least 0.5 μm, desirably at least 1 μm. The concealability tends to be insufficient if the thickness is less than 0.5 μm. While there is no particular upper limitation with respect to the thickness of the thermosensitive recording layer in relation to printability, the metal powder tends to be hardly in-plane oriented in application and the economic property is deteriorated if the thickness is increased beyond necessity. Considering such a point, double or triple coating is preferable in order to obtain a relatively thick layer. In general, the thickness is preferably not more than about several 10 μm, in view of reading of a magnetic signal.

Colored Layer 7

A colored layer 7 is provided on the thermosensitive recording layer 6 when a decorative color tone is required for the thermosensitive recording layer 6. The method of forming this layer, the material and the like are similar to those for the colored layer 4. Its thickness is preferably not more than 10 μm, for a reason similar to that described in relation to a protective layer 8.

Protective Layer 8

The protective layer 8 is provided when high durability is required in particular. At least one resin selected from cellulose derivatives such as nitrocellulose or cellulose acetate, homopolymer or copolymer of acrylic resin such as polymethyl methacrylate, polyethyl methacrylate, polyethyl acrylate or polybutyl acrylate, vinyl chloride resin, vinyl chloride copolymer, polyvinyl butyral, polyvinyl alcohol, polyester resin, polyurethane resin and epoxy resin is listed as resin which can be employed for the protective layer 8. The resin is diluted and mixed with solvent or water with addition of crosslinking agent, plasticizer, stabilizer, viscosity adjuster and/or antistatic agent at need, and thereafter applied by gravure coating, die coating, roll coating or knife coating or printed, to obtain the protective layer 8.

Alternatively, the protective layer 8 may be formed by laminating a plastic film, or by heating and melting hot melt resin and performing die coating.

The distance between a surface of the thermosensitive recording layer 6 which is closer to a thermosensitive printing surface of the thermosensitive magnetic recording medium 1 and the outermost surface of the thermosensitive printing surface of the thermosensitive magnetic recording medium 1, i.e., the thickness of the colored layer 7 or the protective layer 8 which is stacked on the thermosensitive recording layer 6 (when the colored layer 7 or the protective layer 8 is provided), or the total thickness of the colored layer 7 and the protective layer 8 (when both of the colored layer 7 and the protective layer 8 are provided) is important, and this distance is not more than 10 μm, preferably not more than 5 μm. Particularly when information is printed with a thermal head, heat or printing pressure tends not to be sufficiently transmitted to the thermosensitive recording layer 6 and hence printing tends to be unclear if the thickness exceeds the aforementioned value.

In-plane orientation of the metal powder can be improved by pressurizing the same perpendicularly to the plane of the thermosensitive recording layer 6 by a compressor such as a press or a super calender in respective steps of applying the thermosensitive recording layer 6, the colored layer 7 and the protective layer 8 or after application of the protective layer 8. Thus, the concealability of the thermosensitive recording layer 6 with respect to the magnetic recording layer 3 or the colored layer 4 is improved. Further, contact with heat and pressure source as well as reproducibility of fine printing is improved by compressing and smoothing the protective layer which comes directly in contact with a thermal head or the like after the application. The thermosensitive recording layer according to the present invention, which is formed by fine metal powder having shape anisotropy, maintains preferable luster even if the same is subjected to the aforementioned compression, and visibility of printing is not damaged by excessive luster. The pressure applied to the thermosensitive magnetic recording medium preferably exceeds 10 kg/cm$^2$. No effect of compression by pressurization tends to be attained if the pressure is below this value. While there is no particular upper limit as to the pressure, no problem is caused if the pressure is about 500 kg/cm$^2$, which is obtained by a general calender machine.

Thermoplastic Layer 5

Figure 4:
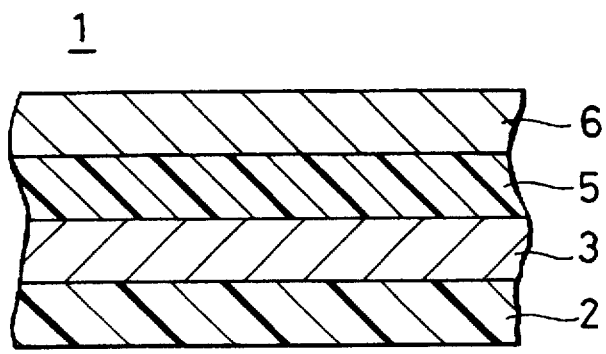
FIG. 4 is a sectional view showing a thermosensitive magnetic recording medium according to a further embodiment of the present invention.

On the other hand, a thermoplastic layer 5 which is provided on the magnetic recording layer 3 directly or through a colored layer 4 as shown in FIG. 3 or 4 is as follows:

A more clear recording image can be obtained by making the thermoplastic layer 5 containing thermofusible material. The thermofusible material is preferably prepared from a material having a melting point of 40° to 150° C. which is lower than that of metals employed for the thermosensitive recording layer 6, so that the material is a solid at the ordinary temperature and fused by heating with a thermal head. Moreover, the thermofusible material having low viscosity in melted state is particularly preferable. The thermofusible material having lower melting point than 40° C. tends to cause a problem of blocking during coating process, while that having higher melting point than 150° C. tends to cause insufficient heat transmission from the thermal head resulting in unclear printing. The preferable thermofusible material is, for example, polyethylene wax, paraffin wax, ester wax, carnauba wax, amide caprylate, amide caproate, amide palmitate, amide stearate, amide oleate, amide eruciate, amide linoleate, amide linolenate, amide N-methylstearate, aniline stearate, amide N-methyloleate, benzanilide, anilide linoleate, amide N-ethylcaprylate, amide N-butyllaurate, N-octadecylacetamide, N-oleinacetamide, N-oleylbenzamide, N-stearylcyclohexylamide, polyethylene glycol, 1-benzyloxynaphthalene, 2-benzyloxynaphthalene, phenyl 1-hydroxynaphthoate, 1,2-diphenoxyethane, 1,4-diphenoxybutane, 1,2-bis(3-methylphenoxy)ethane, 1,2-bis(4-methoxyphenoxy)ethane, 1-phenoxy-2-(4-chlorophenoxy)ethane, 1-phenoxy-2-(4-methoxyphenoxy)ethane, dibenzyl terephthalate, dibenzyl oxalate, di(4-methylbenzyl)oxalate, benzyl p-benzyloxy benzoate, p-benzylbiphenyl, 1,5-bis(p-methoxyphenoxy)-3-oxapentane, 1,4-bis(2-vinyloxyethoxy)benzene, p-biphenyl-p-tolylether, benzyl-p-methylthiophenylether, 2-(2'-hydroxy-5'-methylphenyl)benzotolyazole, 2-hydroxy-4-benzyloxybenzophenone or dicyclohexyl phthalate. Two or more such thermofusible materials can be combined with each other at need, as a matter of course. In particular, paraffin wax removing low melting point components is preferable since the contour of the recording image is clearer. The thermofusible material may be refined with a crusher such as a sand mill, or may be emulsified, while an emulsion type material which can attain a homogeneous grain size is preferable with small bleeding of the recording image.

The thermofusible material can be contained in range of 10 to 100 weight % in the thermoplastic layer 5. If the ratio of thermofusible material is not more than 10 weight %, no sufficient heating value for thermal deformation tends to be transmitted from the thermal head and hence printing tends to be unclear.

Moreover, defoaming agent, dispersant, wetting agent, conductive agent, viscosity adjuster and/or fluorescent dye adopted in ordinary coated papers, and/or white pigment such as $TiO_2$, $BaSO_4$, $CaCO_3$ or the like, and/or coloring agent such as colored pigment, dye or the like may be added to the thermoplastic layer 5 as admixtures adopted together with the thermofusible material.

If the thickness of the thermoplastic layer is smaller than 1 μm, the rate of deformation by heat of the thermal head tends to be small and printing tends to be unclear, while the concealability is reduced and hence the thermosensitive recording layer must be unpreferably increased in thickness. If the thickness of the thermoplastic layer is in excess of 20 μm, on the other hand, no sufficient heating value for thermal deformation tends to be transmitted from the thermal head and hence printing tends to be unclear.

Examples of the present invention are now described, while the present invention is not restricted to these Examples. All parts in the following description are by weight unless otherwise stated. Shapes of metal powder having shape anisotropy contained in paints were confirmed with optical and scan electron microscopes.

(EXAMPLE 1)

Figure 2:
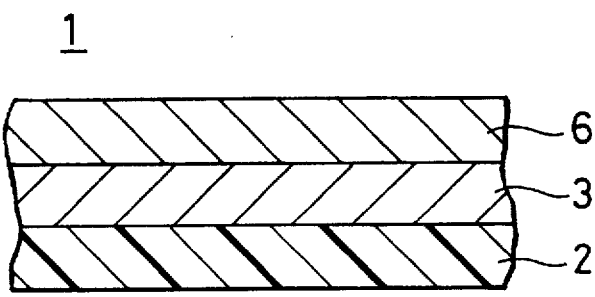
FIG. 2 is a sectional view showing a thermosensitive magnetic recording medium according to another embodiment of the present invention.

Example 1 is a thermosensitive magnetic recording medium 1 provided with no protective, colored or thermoplastic layer, as shown in FIG. 2. In this thermosensitive magnetic recording medium 1, a magnetic recording layer 3 is formed on a base 2, and a thermosensitive recording layer 6 is formed on the magnetic recording layer 3.

Formation of Magnetic Recording Layer 3

A magnetic paint of the following blending was prepared by a sand mill. This magnetic paint was applied onto a polyethylene terephthalate sheet of 188 μm in thickness serving as the base 2 by gravure coating, dried and thereafter thermally set, for obtaining the magnetic recording layer 3 of 10 μm thickness.

| | |
|---|---|
| γ-$Fe_2O_2$ | 100 parts |
| polyurethane resin | 15 parts |
| (Nippolan N-3113 by Nippon Polyurethane Industry Co. Ltd. | |
| partially saponified vinyl chloride-vinyl acetate copolymer | 15 parts |
| (S-LEC A by Sekisui Chemical Co., Ltd.) | |
| methyl ethyl ketone | 120 parts |
| toluene | 60 parts |
| isocyanate crosslinking agent | 10 parts |
| (Coronate L by Nippon Polyurethane Industry Co., Ltd.) | |

Formation of Thermosensitive Recording Layer 6

A paint for a thermosensitive recording layer was prepared in the following blending ratios so that the volume content of tin powder after drying was 24%. This paint was applied onto the aforementioned magnetic recording layer 3 in thickness of 4 μm by gravure coating, to obtain the thermosensitive layer 6.

| | |
|---|---|
| flat tin powder A | 100 parts |
| oleyl alcohol | 1 part |
| polyvinyl acetal resin | 42 parts |
| (S-LEC B by Sekisui Chemical Co., Ltd.) | |
| methyl ethyl ketone | 200 parts |
| toluene | 70 parts |
| used sand mill | |
| OSG-31 by Igarashi Machine Manufacturing Co. Ltd. | |
| used glass beads (1.2 mm in mean diameter) | 300 parts |
| treatment time | 2 hours |

The flat tin powder A contained in the aforementioned paint was about 1 μm in thickness with aspect ratio of about 20. A material obtained by working raw material, tin powder, under the following conditions, thereafter washing the same with methyl ethyl ketone, and drying the same was employed.

| | |
|---|---|
| raw material tin powder | 100 parts |
| (Sn-S-200 by Fukuda Metal Foil and Powder Co., Ltd.) | |
| oleyl alcohol | 1 part |
| toluene | 300 parts |
| used sand mill | |
| OSG-31 by Igarashi Machine Manufacturing Co. Ltd. | |
| used glass beads (0.6 mm in mean diameter) | 200 parts |
| treatment time | 60 hours |

(EXAMPLE 2)

A thermosensitive magnetic recording medium of Example 2 was obtained similarly to Example 1, except that the applied thickness of a thermosensitive recording layer 6 was changed to 15 μm.

(EXAMPLE 3)

Flat tin powder B worked under the following conditions was employed to prepare a paint for a thermosensitive recording layer having the same composition as Example 1. The flat tin powder B was about 3 μm in thickness with aspect ratio of about 5, and the applied thickness of a thermosensitive recording layer 6 was set at about 10 μm. Other sample preparation conditions were identical to those of Example 1.

| | |
|---|---|
| tin powder | 100 parts |
| (Sn-S-200 by Fukuda Metal Foil and Powder Co., Ltd.) | |
| oleyl alcohol | 1 part |
| toluene | 300 parts |
| used sand mill | |
| OSG-31 by Igarashi Machine Manufacturing Co. Ltd. | |
| used glass beads (2.4 mm in mean diameter) | 400 parts |
| treatment time | 6 hours |

(Comparative Example 1)

Tin powder was further finely crushed with a sand mill under the same raw material tin powder working conditions as Example 3, to obtain massive tin powder C having aspect ratio of about 1 (treatment time: 100 hours). This tin powder was employed to prepare and apply a paint for a thermosensitive recording layer having the same composition as Example 1. Other sample preparation conditions were identical to those of Example 1.

(Comparative Example 2)

A paint for a thermosensitive recording layer was prepared with a sand mill so that the volume content of tin powder after drying was 69%. Other sample preparation conditions were identical to those of Example 1.

| | |
|---|---|
| flat tin powder A | 100 parts |
| oleyl alcohol | 1 part |
| polyvinyl acetal resin | 5 parts |
| (S-LEC B by Sekisui Chemical Co., Ltd.) | |
| methyl ethyl ketone | 90 parts |
| toluene | 45 parts |

(Comparative Example 3)

A paint for a thermosensitive recording layer was prepared with a sand mill in the following blending ratios so that the volume content of tin powder after drying was 3%. Other sample preparation conditions were identical to those of Example 1.

| | |
|---|---|
| flat tin powder A | 100 parts |
| oleyl alcohol | 1 part |
| polyvinyl acetal resin | 436 parts |
| (S-LEC B by Sekisui Chemical Co., Ltd.) | |
| methyl ethyl ketone | 840 parts |
| toluene | 420 parts |

(EXAMPLE 4)

Compression

The sample plane of the sample prepared in Example 1 was further perpendicularly pressurized with a press under pressure of 1500 kg/cm$^2$.

(EXAMPLE 5)

Compression

The sample plane of a sample prepared similarly to Example 1 was further perpendicularly pressurized with a super calender under pressure of 10 kg/cm$^2$.

(EXAMPLE 6)

Formation of Protective Layer

Example 6 was prepared similarly to Example 1, except that ultraviolet curing OP (over printing) varnish (T and K by TOKA Co., Ltd.) was offset-printed on a thermosensitive recording layer 5 which was stacked on a magnetic recording layer 3 and ultraviolet-cured for forming a protective layer 8 shown in FIG. 1. The thickness of the protective layer 8 was 0.5 μm.

(EXAMPLE 7)

Formation of Colored Layer

Example 7 was prepared similarly to Example 1, except that only a colored layer 4 shown in FIG. 1 was formed after a magnetic recording layer 3 was formed similarly to Example 1. This colored layer 4 was formed by applying a paint of the following blending in thickness of 3 μm by gravure coating.

| | |
|---|---|
| pigment | 10 parts |
| polyvinyl acetal resin | 20 parts |
| (S-LEC B by Sekisui Chemical Co., Ltd.) | |
| methyl ethyl ketone | 120 parts |
| toluene | 60 parts |

| | | |
|---|---|---|
| isocyanate curing agent | 3 parts | |
| (Coronate HL by Nippon Polyurethane Industry Co., Ltd.) | | |

(EXAMPLE 8)
Formation of Colored Layer

A paint of the following blending was applied onto a sample which was prepared similarly to Example 1 in a thickness of 2 μm by gravure coating, to form a colored layer 7 shown in FIG. 1. Other conditions were identical to those of Example 1.

| | |
|---|---|
| pigment | 3 parts |
| polyvinyl acetal resin | 20 parts |
| (S-LEC B by Sekisui Chemical Co., Ltd.) | |
| methyl ethyl ketone | 70 parts |
| toluene | 35 parts |
| isocyanate cross linking agent | 3 parts |
| (Coronate HL by Nippon Polyurethane Industry Co., Ltd.) | |

(Comparative Example 4)
Formation of Colored Layer

Comparative Example 4 was prepared similarly to Example 8, except that a sample prepared similarly to Example 1 was coated with a colored layer 7 which was similar to that of Example 8 in a thickness of 15 μm.

(EXAMPLE 9)
Formation of Colored Layer

A colored layer 7 of the same blending as that employed in Example 8 was further applied onto a sample which was prepared similarly to Example 7 in a thickness of 2 μm by gravure coating. Namely, this Example was different in structure from Example 1 in a point that the colored layers 4 and 7 shown in FIG. 1 were further formed.

(EXAMPLE 10)
Formation of Protective Layer

Similarly to Example 6, a protective layer 8 was printed on a sample which was prepared similarly to Example 8 in thickness of 0.5 μm. Namely, this Example was different in structure from Example 1 in a point that the colored layer 7 and the protective layer 8 shown in FIG. 1 were further formed.

(EXAMPLE 11)
Formation of Protective Layer

Similarly to Example 6, a protective layer 8 was printed on a sample which was prepared similarly to Example 9 in thickness of 0.5 μm. Namely, this Example was different in structure from Example 1 in a point that the colored layers 4 and 7 and the protective layer 8 shown in FIG. 1 were further formed.

The following various evaluation tests were made on the samples obtained in Examples and comparative examples.

[Surface Roughness Evaluation Test]

Surface roughness indicates smoothness of a coated surface of each Example which is in contact with a magnetic head or a thermal head. As to the smoothness, center line surface roughness (μm) was measured with a tracer type surface roughness meter (TDF-3A, three-dimensional roughness measurer by Kosaka Kenkyusho Co., Ltd.).

[Printability Evaluation Test]

Printability, which indicates readability of characters printed with a thermal head, can be evaluated from density difference between an unprinted portion (A) and a printed portion (B) measured with a Macbeth densitometer (PCM2 by Kollmorgen Instruments Corporation). The contrast between the printed portion and the unprinted portion is increased to improve visibility of printing as the numerical value is increased. Visibility is determined if the numerical value is at least 3. A card reader/writer employed for printing was GBM-800AS by Sanwa New Tech Co., Ltd.

[Magnetic Recording Deterioration Evaluation Test]

In order to investigate presence/absence of deterioration of magnetic recording by thermosensitive printing, printing was made on various thermosensitive magnetic recording media in which magnetic signals were previously recorded with currents of 100 FCPI (flux change per inch) 250 mA. Thereafter the magnetic signals were reproduced and changes of average reproduction outputs before and after printing were measured. The output changes were at practical levels of not more than 5% in all samples of Examples and comparative examples.

The magnetic signals were reproduced by CRS-700H by Sanwa New Tech. Co., Ltd.

Table 1 shows the results of the aforementioned evaluation tests.

TABLE 1

| | Surface Roughness (μm) | Unprinted portion (A) | Printed portion (B) | Printability (A − B) |
|---|---|---|---|---|
| Example | | | | |
| 1 | 0.1 | 17 | 8 | 9 |
| 2 | 0.3 | 22 | 16 | 6 |
| 3 | 1.5 | 21 | 18 | 3 |
| 4 | 0.3 | 19 | 8 | 11 |
| 5 | 0.4 | 17 | 8 | 9 |
| 6 | 0.8 | 17 | 9 | 8 |
| 7 | 0.4 | 17 | 8 | 9 |
| 8 | 0.2 | 14 | 8 | 6 |
| 9 | 0.2 | 14 | 8 | 6 |
| 10 | 0.4 | 14 | 9 | 5 |
| 11 | 0.4 | 14 | 5 | |
| Comparative example | | | | |
| 1 | 0.3 | 22 | 20 | 2 |
| 2 | 3.0 | 22 | 22 | 0 |
| 3 | 0.3 | 9 | 8 | 1 |
| 4 | 0.2 | 11 | 11 | 0 |

<Evaluation>

Comparing Examples 1 and 3 with each other, it is understood that the thickness of the flat metal powder is preferably reduced in view of printability and surface roughness. It is understood from the results of comparative example 1 that sufficient visibility cannot be attained with an aspect ratio of 1. It is also understood that excellent visibility cannot be attained if the content of the metal powder in the thermosensitive recording layer is too high or too low. From these results, it can be said that metal powder having a small thickness and a high aspect ratio is excellent in printability. This is conceivably because heat can be efficiently incorporated since the surface area per unit weight is increased, and deformation caused by heat or pressure is easy due to the thinness.

It is also understood that surface roughness is increased if the metal powder content of the thermosensitive recording layer 6 is too high (see comparative example 2). Therefore, modulation of magnetic recording signals is increased in comparative example 2. This means irregularization of reproduction waveforms which are originally outputted in regularized amplitudes, and it has concretely been confirmed that the minimum amplitude of reproduction waveforms was 50% of the maximum amplitude. In the long run, a practical magnetic recording property cannot be attained. In this point, practical surface roughness is preferably up to about 2.0 µm. If the metal powder content is too low (see comparative example 3), on the other hand, concealability of the thermosensitive recording layer with respect to the magnetic recording layer is reduced, density of the unprinted portion is increased and the background is darkened, and hence visibility is deteriorated and the printing is hard to read.

Comparing Examples 1, 4 and 5 with each other, it is understood that surface roughness, concealability and printability are further improved by perpendicularly pressurizing the thermosensitive recording layer surface with pressure exceeding at least 10 kg/cm² after formation of the thermosensitive recording layer 6.

It is understood that performance can be maintained also when a proper colored layer is stacked between the magnetic recording layer 3 and the thermosensitive recording layer 6 or on the thermosensitive recording layer 6, or the protective layer 8 is stacked on the outermost surface in the present invention (see Examples 6, 7, 8, 9, 10 and 11).

Printability is reduced when an extremely thick colored layer or the like is stacked on the thermosensitive recording layer 6 (see comparative example 4). This is conceivably because heat or pressure of a thermal head or the like does not sufficiently reach the thermosensitive recording layer and the flat tin powder contained in the thermosensitive recording layer 6 is insufficiently deformed.

In addition to the aforementioned evaluation tests, evaluation was made by changing the strength of the inventive thermosensitive recording layer 6 as follows:

The inventive thermosensitive magnetic recording medium 1 was compared with a conventional metal deposition type thermosensitive magnetic recording medium in such a state that its thermosensitive recording layer was exposed on a card surface. Namely, the comparison was made in a state of providing neither colored layer nor protective layer on the thermosensitive recording layer. When the metal deposition type thermosensitive magnetic recording medium was applied to a card writer/reader (GBM-800AS by Sanwa New Tech Co., Ltd.), the thermosensitive recording layer was immediately flawed. When the inventive thermosensitive magnetic recording medium formed by Example 1 was similarly applied to the card writer/reader, on the other hand, absolutely no flaw was caused.

While the metal deposition thermosensitive recording layer was easily corroded when the same was dipped in 10% acetic acid solution or brine, no occurrence of corrosion was recognized on the inventive thermosensitive recording layer according to Example 1 and it has been possible to confirm that the same was excellent in corrosion resistance.

From the aforementioned results, it has been clarified that the thermosensitive magnetic recording medium according to the present invention has excellent thermosensitive recordability with no damage of magnetic recordability, high mechanical strength and excellent corrosion resistance.

(EXAMPLE 12)

Example 12 is a thermosensitive magnetic recording medium 1 provided with neither protective layer nor colored layer, as shown in FIG. 4. In this thermosensitive magnetic recording medium 1, a magnetic recording layer 3 is formed on a base 2, a thermoplastic layer 5 is formed on the magnetic recording layer 3, and a thermosensitive recording layer 6 is formed on the thermoplastic layer 5.

The magnetic recording layer 3 was formed on the base 2 similarly to Example 1, and thereafter the following thermoplastic layer containing thermoplastic resin was applied onto the magnetic recording layer 3 in a thickness of 10 µm by bar coating, for forming the thermoplastic layer 5.

| | |
|---|---|
| zinc stearate dispersed solution (Hydrin Z-7-30 by Chukyo Oil and Fat Co., Ltd.) | 70 parts |
| polyvinyl alcohol (NM11Q by Nihon Synthesis Co., Ltd.) | 30 parts |

A thermosensitive recording layer 6 was formed on the thermoplastic layer 5 similarly to Example 1. In this Example, tin powder (Sn-S-350 (350 meshes) by Fukuda Metal Foil and Powder Co., Ltd.) was lustered for a paint, in a thickness of 1 µm with an aspect ratio of about 20. No oleyl alcohol was introduced into the paint for the thermosensitive recording layer.

(EXAMPLE 13)

A thermosensitive magnetic recording medium according to Example 13 was obtained similarly to Example 12, except that the applied thickness of a thermoplastic layer 5 was changed to 15 µm.

(EXAMPLE 14)

A thermosensitive magnetic recording medium according to Example 14 was obtained similarly to Example 12, except that a thermoplastic layer of the following blending was applied by bar coating in a thickness of 5 µm.

| | |
|---|---|
| amide ethylenebisstearate emulsion (Himicron G110 by Chukyo Oil and Fat Co., Ltd.) | 80 parts |
| starch (Oji Ace A by Oji Cornstarch Co., Ltd.) | 20 parts |

(EXAMPLE 15)

Compression

The sample plane of the sample prepared in Example 12 was further perpendicularly pressurized with a press under pressure of 1500 kg/cm².

(EXAMPLE 16)

Compression

The sample plane of a sample which was prepared similarly to Example 12 was further perpendicularly pressurized with a super calender under pressure of 10 kg/cm².

(EXAMPLE 17)

Formation of Protective Layer

Ultraviolet curing OP varnish (T and K by TOKA Co., Ltd.) was offset-printed on the thermosensitive recording layer 6 of the thermosensitive magnetic recording medium which was formed by Example 12 and ultraviolet-cured for forming a protective layer 8 shown in FIG. 3. The thickness of the protective layer 8 was 0.5 µm.

(EXAMPLE 18)

Formation of Colored Layer

Example 18 was prepared similarly to Example 12 except that a colored layer 4 shown in FIG. 3 was formed after a magnetic recording layer 8 was formed similarly to Example 12. This colored layer was formed by applying a paint of the following blending in a thickness of 3 µm by gravure coating.

| pigment | 10 parts |
|---|---|
| polyvinyl acetal resin | 20 parts |
| (S-LEC B by Sekisui Chemical Co., Ltd.) | |
| methyl ethyl ketone | 120 parts |
| toluene | 60 parts |
| isocyanate curing agent | 3 parts |
| (Coronate HL by Nippon Polyurethane Industry Co., Ltd.) | |

(EXAMPLE 19)
Formation of Colored Layer

Example 19 was prepared similarly to Example 12 except that a colored layer 7 shown in FIG. 3 was applied onto a thermosensitive recording layer 6 which was prepared similarly to Example 12 by gravure coating in the following blending.

| pigment | 3 parts |
|---|---|
| polyvinyl acetal resin | 20 parts |
| (S-LEG B by Sekisui Chemical Co., Ltd.) | |
| methyl ethyl ketone | 70 parts |
| toluene | 35 parts |
| isocyanate curing agent | 3 parts |
| (Coronate HL by Nippon Polyurethane Industry Co., Ltd.) | |

(EXAMPLE 20)
Formation of Colored Layer

A colored layer 7 of the same blending as that employed in Example 19 was further applied onto a sample which was prepared similarly to Example 18 in a thickness of 2 μm by gravure coating. Namely, this Example was different in structure from Example 12 in a point that the colored layers 4 and 7 shown in FIG. 3 were further formed.

(EXAMPLE 21)
Formation of Protective Layer

Similarly to that formed in Example 17, a protective layer 8 was printed on a sample which was prepared similarly to Example 19 in a thickness of 0.5 μm. Namely, this Example was different in structure from Example 12 in a point that the colored layer 7 and the protective layer 8 shown in FIG. 3 were further formed.

(EXAMPLE 22)
Formation of Protective Layer

Similarly, to that formed in Example 17, a protective layer 8 was printed on a sample which was prepared similarly to Example 20 in a thickness of 0.5 μm. Namely, this Example was different in structure from Example 12 in a point that all of the colored layers 4 and 7 and the protective layer 8 shown in FIG. 3 were further formed.

[Printability Evaluation Test]

As to printability, readability of characters printed with a thermal head was sensorially evaluated.

⊙: clearly printed

○: clearly printed at a level with no problem in practice

The card reader/writer employed for printing was GBM-800AS by Sanwa New Tech Co., Ltd.

[Surface Lustrousness]

Metal surface lustrousness of the thermosensitive recording layers was sensorially evaluated.

⊙: the same level as a tin-deposited thermosensitive recording layer

○: tendency to be sandy

[Concealability]

○: the same level as a tin-deposited thermosensitive recording layer

TABLE 2

| Example | Evaluation of Printability | Surface Luster | Concealability |
|---|---|---|---|
| 1 | ○ | ○ | ○ |
| 12 | ⊙ | ⊙ | ○ |
| 13 | ⊙ | ⊙ | ○ |
| 14 | ⊙ | ⊙ | ○ |
| 15 | ⊙ | ⊙ | ○ |
| 16 | ⊙ | ⊙ | ○ |
| 17 | ⊙ | ⊙ | ○ |
| 18 | ⊙ | ⊙ | ○ |
| 19 | ⊙ | ⊙ | ○ |
| 20 | ⊙ | ⊙ | ○ |
| 21 | ⊙ | ⊙ | ○ |
| 22 | ⊙ | ⊙ | ○ |

Comparing Example 1 with Examples 12 to 22, printing was made clear by providing the thermoplastic layer 5 under the thermosensitive recording layer 6.

Especially, examples 12, 15, 16, 18, and 19 were superior in clearness.

When metal grains employed for the thermosensitive recording layer 3 get coarse, for example, concealability tends to be deteriorated and printing tends to be unclear.

When the thermoplastic layer 5 gets thick, for example, no heating value sufficient for thermal deformation tends to be transmitted from a thermal head and printing tends to be unclear.

When the colored layer 7 gets thick, for example, no heating value sufficient for thermal deformation tends to be transmitted from a thermal head and printing tends to be unclear.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A thermosensitive magnetic recording medium for recording by a thermal head comprising a base, a magnetic recording layer and a thermosensitive recording layer, said thermosensitive recording layer comprising a binder and non-magnetic metal powder particles having shape anisotropy and having a melting point not higher than the melting point of Al.

2. The thermosensitive magnetic recording medium in accordance with claim 1, wherein surfaces of said non-magnetic metal powder particles are lustered by a leafing treatment.

3. The thermosensitive magnetic recording medium in accordance with claim 1, wherein said non-magnetic metal powder particles have a flat shape of not more than 3 μm in thickness with an aspect ratio (mean diameter/mean thickness) of at least 3.

4. The thermosensitive magnetic recording medium in accordance with claim 1, wherein said non-magnetic metal powder particles have a rod shape with a minor axis length of not more than 3 μm and a ratio of a major axis length to said minor axis length of at least 3.

5. The thermosensitive magnetic recording medium in accordance with claim 1, wherein said non-magnetic metal powder particles comprise at least one metal selected from the group consisting of In, Sn, Bi, Cd, Pb, Zn, Te and Al, and alloys thereof.

6. The thermosensitive magnetic recording medium in accordance with claim 1, wherein the volume of said non-magnetic metal powder particles is 5 to 60% with respect to that of all solid components contained in said thermosensitive recording layer.

7. The thermosensitive magnetic recording medium in accordance with claim 1, wherein a colored layer of a different color from said magnetic recording layer is further provided between said magnetic recording layer and said thermosensitive recording layer.

8. The thermosensitive magnetic recording medium in accordance with claim 1, wherein a protective layer is further provided on said thermosensitive recording layer.

9. A thermosensitive magnetic recording medium for recording by a thermal head comprising:

a magnetic recording layer provided on a base;

a thermoplastic layer provided on said magnetic recording layer; and a thermosensitive recording layer provided on said thermoplastic layer, said thermosensitive recording layer comprising a binder and non-magnetic metal powder particles having a melting point not higher than the melting point of Al and having shape anisotropy, said thermoplastic layer comprising a material having a melting temperature which is lower than that of said non-magnetic metal powder of said thermosensitive recording layer.

10. The thermosensitive magnetic recording medium in accordance with claim 9, wherein the thickness of said thermoplastic layer is 1 to 20 μm.

11. The thermosensitive magnetic recording medium in accordance with claim 9, wherein said thermoplastic layer includes thermofusible material.

12. The thermosensitive magnetic recording medium in accordance with claim 9, wherein surfaces of said non-magnetic metal powder particles are lustered by a leafing treatment.

13. The thermosensitive magnetic recording medium in accordance with claim 9, wherein said non-magnetic metal powder particles have a flat shape of not more than 3 μm in thickness with an aspect ratio (mean diameter/mean thickness) of at least 3.

14. The thermosensitive magnetic recording medium in accordance with claim 9, wherein said non-magnetic metal powder particles have a rod shape with a minor axis length of not more than 3 μm and a ratio of a major axis length to said minor axis length of at least 3.

15. The thermosensitive magnetic recording medium in accordance with claim 9, wherein said non-magnetic metal powder comprises at least one metal selected from the group consisting of In, Sn, Bi, Cd, Pb, Zn, Te and Al, and alloys thereof.

16. The thermosensitive magnetic recording medium in accordance with claim 9, wherein the volume of said non-magnetic metal powder particles is 5 to 60% with respect to that of all solid components contained in said thermosensitive recording layer.

17. The thermosensitive magnetic recording medium in accordance with claim 9, wherein a colored layer of a different color from said magnetic recording layer is further provided between said thermoplastic layer and said thermosensitive recording layer.

18. The thermosensitive magnetic recording medium in accordance with claim 9, wherein a protective layer is further provided on said thermosensitive recording layer.

* * * * *